Patented July 22, 1941

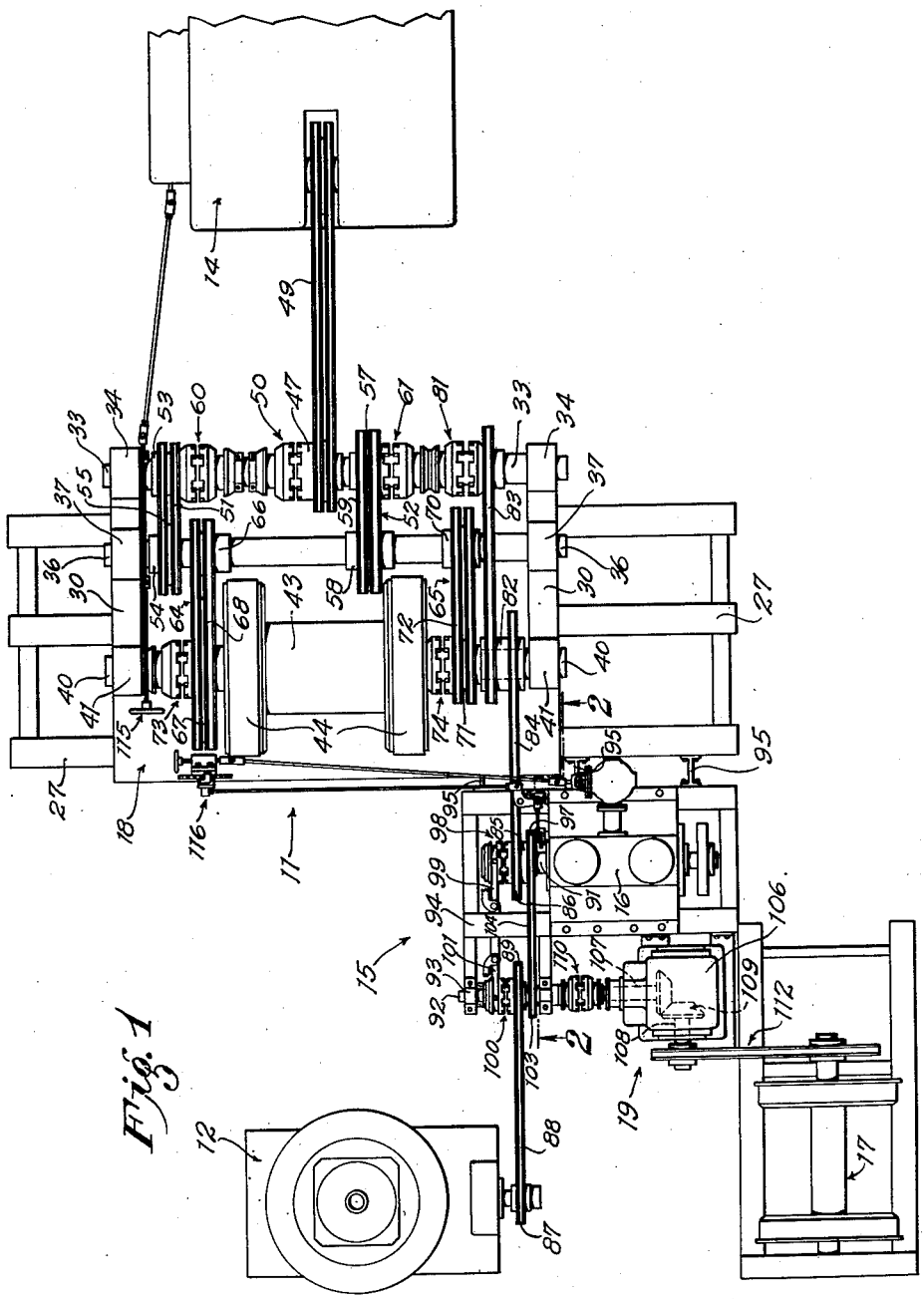

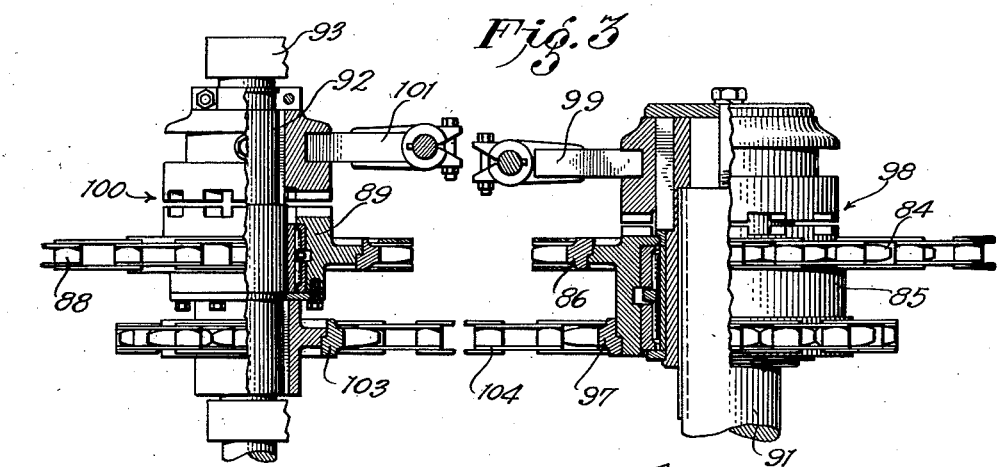
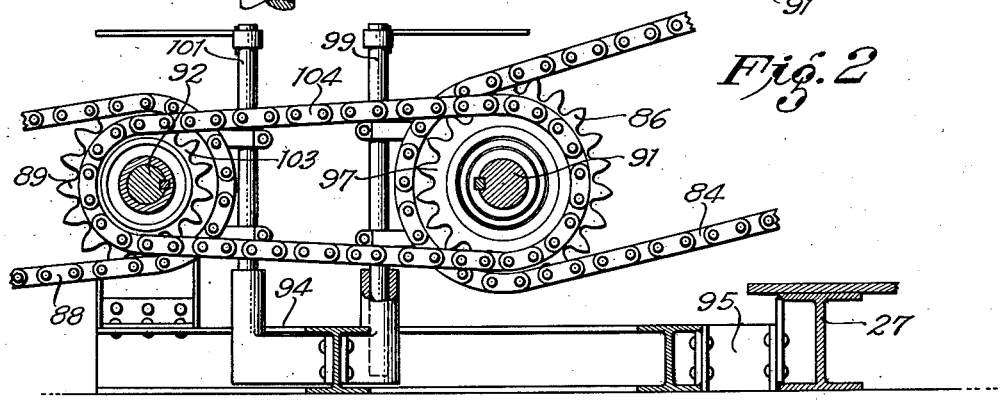
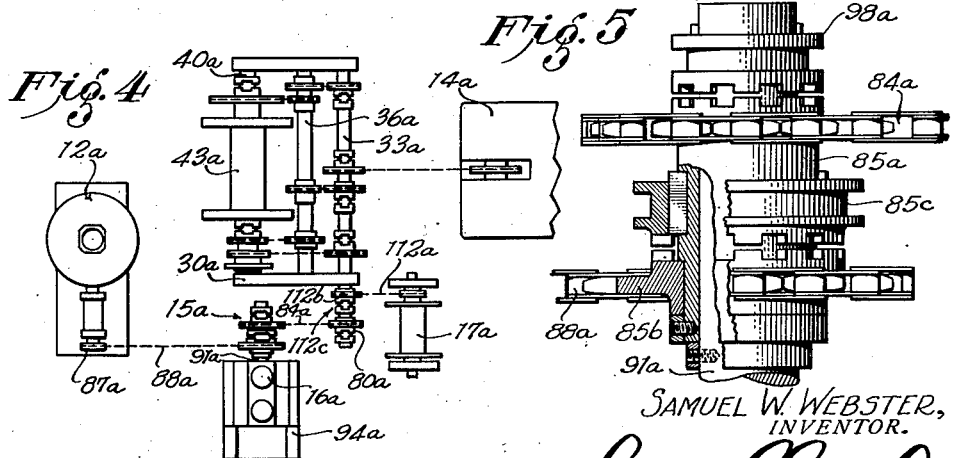

2,249,873

UNITED STATES PATENT OFFICE 2,249,873

AUXILIARY ENGINE DRIVE FOR DRAWWORKS

Samuel W. Webster, Houston, Tex., assignor to Emsco Derrick & Equipment Company, Los Angeles, Calif., a corporation of California Application May 6, 1939, Serial No. 272,254

3 Claims. (Cl. 255—19)

My invention relates to drive means commonly employed in derricks in the drilling of oil wells for driving the hoisting apparatus for hoisting various tools, drill pipe, casing, etc., and for driving the rotary machine.

My invention relates more particularly to a unique combination which includes a drawworks, a drive connection whereby the drawworks is drivably connected to the rotary machine, and an auxiliary drive means connected to the drive connection between the drawworks and the rotary machine, the combination being so constructed and arranged that the drawworks may be employed to drive the rotary machine, the auxiliary drive means may be employed to drive the rotary machine, or the auxiliary drive means may be employed to operate the drawworks.

I believe my invention to be broadly new not only in its entirety but in the several sub-combinations and parts which are employed therein. In addition to the three main parts referred to above my invention also compehends the inclusion of other parts and elements. I wish my invention to be broadly construed in accordance with the appended claims and not be limited to particular details of construction which shall be described hereinafter.

In order that the features and advantages of my invention may be better understood, I will make brief reference to the oil drilling industry. At the present time oil wells are drilled to a considerable depth, and in order to raise and lower the various parts, particularly the drill pipe, at optimum efficiency, it is necessary to have a drawworks with a number of different speeds and powers. When the well is relatively shallow the power required to raise the drill pipe is quite small as compared with the power required to raise the drill pipe when the well is at a considerable depth. Also, the power required to drive the rotary machine is usually considerably less than that required to handle a long string of drill pipe. For this reason, in the common type of drawworks now in use today employing a heavy steam engine for operating the drawworks, there is a considerable waste of power when the rotary table is being rotated and the hoisting apparatus of the drawworks is not in operation or when the hoisting apparatus is required to handle but relatively light loads.

It is an object of my invention to provide a drawworks and rotary machine combination in which the drawworks may be driven by a main engine capable of delivering great power and in which the drawworks or the rotary machine may be operated by a second engine called an auxiliary engine, which is of considerable less horse power but is of sufficient horse power to operate the rotary machine or the drawworks when handling light loads.

It is another object of my invention to provide a drawworks and rotary machine combination in which the auxiliary drive means or auxiliary engine may be employed to operate the rotary machine even during the time that the hoisting apparatus of the drawworks is in operation. This is a valuable feature of my invention and enables various operations to be performed which cannot be performed with the ordinary drawworks, such for example as "drilling up" in order to loosen a stuck drill pipe; that is to say, the auxiliary engine may be employed to rotate the drill pipe, while the hoisting apparatus of the drawworks is employed to raise the drill pipe at the same time. This method has been found to be quite effective in loosening stuck drill pipe.

It is an object of my invention to provide a rotary drawworks in which two engine drives are provided, either of which may be employed to drive either the drawworks or the rotary machine so that in case of an emergency when one engine fails the other may be employed, thus eliminating shut down of the apparatus.

It is a still further object of my invention to provide a drawworks combination having means whereby a robishaw reel or other drum may be operated, preferably independently of the other apparatus so that it will be unnecessary to have a number of shafts of the drawworks rotating during this operation.

It is a still further object of my invention to provide a combination including a drawworks, a rotary machine, and a drive connection between the drawworks and the rotary machine, which combination includes an auxiliary engine preferably placed on the derrick floor and operatively connected to the drive means between the drawworks and the rotary machine so that when desired suitable clutch means may be operated so that the auxiliary engine may be employed to drive either the rotary machine or the drawworks.

It is another object of my invention to provide a combination of the character pointed out in the preceding paragraph in which the drive means between the rotary machine and the drawworks includes a transmission which transmits power from the drawworks to the rotary machine and with which transmission the auxiliary engine is connected, the transmission being so designed that the auxiliary engine may be employed so that power delivered to the transmission from the auxiliary engine may be used to operate either the rotary machine or the drawworks.

It is another object of my invention to provide a combination of the character pointed out in either of the preceding paragraphs in which a sand reel, robishaw reel, or the like, is placed at the side of the derrick floor and is operated either by the drawworks or the auxiliary engine, the reel or drum being clearly and conveniently visible to the driller so that he may watch its operation.

It is a still further object of my invention to provide a combination of the character pointed out in which the auxiliary engine is placed on the derrick floor and in which the controls for the auxiliary engine and also for the main engine extend to the usual driller's station beside the drawworks so that either of the engines may be conveniently operated.

Other objects and advantages of my invention will become apparent in the course of the following description of different forms of my invention, which I have chosen for the purpose of illustrating the various features and advantages thereof.

Referring to the drawings:

Fig. 1 is a plan view diagrammatically illustrating the combination incorporating the features of my invention.

Fig. 2 is a fragmentary sectional view taken as indicated by the line 2—2 of Fig. 1.

Fig. 3 is a fragmentary sectional view through the two shafts constituting a part of the transmission, certain of the elements being in section to illustrate the details thereof.

Fig. 4 is a diagrammatic plan view of an alternative form of my invention.

Fig. 5 is a fragmentary plan view partly in section showing the transmission of the alternative form of my invention.

Referring to Figs. 1 to 3, inclusive, numeral 11 represents the drawworks which is preferably placed on the floor of the derrick. Numeral 12 represents a rotary machine which is placed over the top of the well and through which the drill pipe is extended. The numeral 14 represents a main engine which is ordinarily provided for driving the drawworks 11. The numeral 15 represents a transmission which is employed in or as a part of the rotary drive means or drive connection between the drawworks 11 and rotary machine 12, as will later be described in detail. The numeral 16 represents an auxiliary drive means or auxiliary drive engine. The numeral 17 represents a sand reel or robishaw drive which, in my invention, is placed at one side of the derrick floor, as shown, where it is accessible to view by the driller who stands in his usual station at one corner of the drawworks as designated by the numeral 18. The numeral 19 represents the drive connection whereby the sand reel or robishaw drive 17 may be driven.

These parts just described constitute the main elements of my invention. It will be understood that my invention in its broadest aspect includes the provision of the auxiliary drive means in combination with the drawworks and rotary machine and that other parts, if their features and advantages were not required, might be eliminated. The other parts and features, such as the sand reel, or robishaw drive 17, and the drive means 19 therefore might be eliminated but in such event the features and advantages of this part of my invention would not be available for use.

Having described the main elements of the combination of my invention I will now refer to the various parts in detail and describe their new cooperation.

The drawworks 11 includes a frame structure 27 having upright bearing supporting structures 30. The numeral 33 represents a jack shaft which extends in a horizontal plane across the drawworks in a position near the rear part thereof, being rotatably supported by bearings 34 mounted on the upright structures 30. There is also a line shaft 36 which is mounted in a horizontal position parallel to the jack shaft but in a position forwardly thereof and higher than the jack shaft. This line shaft is supported by bearings 37. Positioned forwardly of the two shafts 33 and 36 is a drum shaft 40 which extends parallel to the other two shafts and which is supported by bearings 41, and which has secured thereto a hoisting drum 43 which, according to usual practice, is provided with brake structures 44 operated by suitable brake operating mechanism well known in the industry and which, for the sake of simplicity, has not been illustrated.

The jack shaft 33 has a jack shaft drive sprocket 47 which is driven by the main engine 14 through a sprocket chain 49. This sprocket 47 is rotatable on the jack shaft 33 but may be fixed to and caused to drive the jack shaft by engaging a clutch 50. This clutch 50, as well as any of the other clutches of the apparatus, is operated by clutch operating means well known and commonly employed in the industry and which may be applied by any skilled mechanic. Since the invention does not relate to the provision of clutch operating mechanism nor to the details of construction thereof, and since the illustrating of such parts on the drawings might lead to confusion, these parts have not been illustrated.

The line shaft 36 may be driven from the jack shaft by a primary line shaft drive 51 or a secondary line shaft drive 52, the first mentioned line shaft drive including a sprocket 53 rotatably mounted on the jack shaft 33, a sprocket 54 fixed to the line shaft 36, and a sprocket chain 55 extending over these two sprockets; and the second mentioned line shaft drive including a sprocket 57 rotatable on the jack shaft 33, a sprocket 58 fixed to the line shaft 36, and a sprocket chain 59 extending over these two sprockets. Either drive may be employed, depending upon the positions of clutches 60 and 61 mounted on the jack shaft 33 and adapted to lock either the sprocket 53 or the sprocket 57 to the jack shaft.

The drum shaft 40 may be driven by a primary drum shaft drive 64 or a secondary drum shaft drive 65, the former including a sprocket 66 fixed to the line shaft, a sprocket 67 rotatable on the drum shaft, and a chain 68 extending around these two sprockets; and the latter drive including a sprocket 70 fixed to the line shaft, a sprocket 71 rotatable on the drum shaft and a chain 72 extending around the sprockets 70 and 71. Either of these drives may be brought into operation by the actuation of a clutch 73 or a clutch 74 which locks the sprockets 67 and 71 respectively to the drum shaft 40.

For the purpose of forming a rotary drive means or driving connection between the drawworks and the rotary machine and the auxiliary engine, my invention provides a rotary machine driven sprocket 80 rotatably mounted on one of the shafts of the drawworks and preferably the jack shaft 33, there being a clutch 81 whereby the sprocket 80 may be locked to the jack shaft 33. Rotatable on the drum shaft 40 is an idler sprocket member 82 which is operatively connected to the sprocket 80 by means of a chain 83. The sprocket member 82 is connected by means of a sprocket chain 84 to a rotatable member 85 of the transmission 15, the chain 84 extending over a sprocket 86 thereof. The rotary machine has a sprocket 87 which is connected by a chain 88 to a sprocket 89 which forms a part of the transmission 15. The parts 80 to 88 and the transmission 15 constitute the drive connection between the drawworks and the rotary machine. The parts 80 to 84 comprise a drive connection between the transmission and the drawworks, and the parts 87 and 88 constitute a drive connection between the rotary machine and transmission.

The transmission of my invention includes a drive shaft 91 and a countershaft or driven shaft 92, the drive shaft 91 preferably extending from the auxiliary engine 16 and supported thereby, and the countershaft being preferably supported by bearings 93 supported by a base 94 which also supports the auxiliary engine 16. To make these parts a firm and integral structure, the base 94 is preferably secured to the frame work 27 of the drawworks by suitable securing means, such as indicated at 95 in Figs. 1 and 2.

The rotatable member 85 which includes the sprocket 86 also includes a sprocket 97. This rotatable member 85 is rotatably supported on the drive shaft 91 so that it may rotate independently thereof. There is provided, however, a clutch 98 having suitable clutch operating mechanism 99 which may be operated to lock the rotatable member 85 to the shaft 91, thus enabling the auxiliary drive means or auxiliary engine 16 to drive the rotatable member 85. The sprocket 89 which is connected to the rotary machine by the chain 88 is rotatable on the countershaft 92. For the purpose of locking the sprocket 89 to the countershaft 92, so as to be rotated therewith, there is provided a clutch 100 having suitable clutch operating means 101. Secured to the countershaft 92 is a sprocket 103 and extending over the sprocket 103 and the sprocket 97 of the rotatable member 85 is a sprocket chain 104. This drive connection between the rotatable member 85 and the shaft 92 causes the shaft 92 to be driven whenever the rotatable member 85 is rotated.

Mounted on the base 94 is a bevel gear box 106 having a drive shaft 107, a driven shaft 108, and bevel gears 109. The drive shaft 107 may be driven by the countershaft 92 by suitable operation of a clutch 110. The driven shaft 108 is connected by sprocket and chain means 112 to the sand reel or robishaw drive 17; thus, whenever the clutch 110 is engaged, the drive 17 may be operated by the transmission.

The numeral 115 represents the control for the main engine 14, and the numeral 116 represents the controls for the auxiliary engine 16. It will be seen that these controls extend to the driller's station 18 at the corner of the drawworks.

My invention just described may be operated as follows: When employing the main engine 14 to drive the drawworks, the clutch 50 is engaged. The line shaft is driven through either the primary or secondary drives 51 or 52, and the drum shaft is driven through either of the primary or secondary drives 64 or 65 between the line shaft or the drum shaft. If the rotary machine is not to be operated at this time by the drawworks, the clutch 81 is disengaged. If the rotary machine is to be operated by the drawworks, the clutch 81 is engaged and the clutch 100 of the transmission 15 is also engaged. When the parts are in these positions (the clutch 98 being disengaged) the chain 83 drives the rotatable member 82, the rotatable member 82 drives the chain 84, which in turn drives the rotatable member 85, the rotatable member 85 drives the chain 104, which in turn drives the auxiliary shaft 92 by means of the sprocket 103. The clutch 100 being at this time engaged causes the shaft 92 to drive the sprocket 89 and thus the sprocket 89 drives the sprocket 87 of the rotary machine through the medium of the chain 88. If the drum 43 is not being rotated both the clutches 60 and 61 are disengaged with the result that the only part of the drawworks which is being rotated is the jack shaft 33 and the parts which are employed to drive the rotary machine.

With these same parts in operation, the drum 17 may also be rotated by engaging the clutch 110. If it is not desired to have the rotary machine rotating, the clutch 100 may be disengaged and then the drawworks will, through the parts described, be employed solely for the purpose of operating the drum 17.

If it is desired to employ the auxiliary engine to operate the rotary machine, the clutch 81 is disengaged, thus disconnecting the driving relationship between the drive connection connecting the transmission and the drawworks. The clutch 98 is engaged so that the drive shaft 91 of the auxiliary engine 16 may be employed to drive the rotatable member 85. At this time, with the clutch 100 engaged, the auxiliary engine may be employed to drive the rotary machine. With the parts in these positions, the clutch 110 may be engaged and the auxiliary engine employed to drive the drum 17. If the rotary machine is not to be operated, the clutch 100 may be disengaged. At this time the auxiliary engine may be employed solely for the purpose of operating the drum 17. During the operation just described the main engine 14 may be independently employed for operating the drawworks, such, for example, as would be required when drilling in an upward direction such, for example, as to loosen the stuck drill pipe.

If it is desired to employ the auxiliary engine to operate the drawworks, such as might be done when the main engine failed or when very light loads, which would not require the service of the heavy main engine 14, were being handled, the clutch 50 is disengaged, thus disconnecting the sprocket 47 from the jack shaft 33. The clutch 81 is engaged, thus connecting the drive between the transmission and the drawworks. The clutch 98 is engaged in order to enable the drive shaft 91 to drive the rotatable member 85. If the rotary machine 12 is not to be operated, the clutch 100 is disengaged. Also, if the drum 17 is not to be operated, the clutch 110 is disengaged. With the parts in these positions, the auxiliary engine drives the jack shaft 33 and thus operates the drawworks. By engagement of the clutch 100, the rotary machine could also be operated and by engagement of the clutch 110 the drum 17 could also be operated.

With the auxiliary engine and transmission positioned on the derrick floor it is conveniently accessible and within the view of the driller, and furthermore, does not require building of separate foundations or supporting means such as would be required if the auxiliary engine and transmission were placed outside the derrick. A further advantage of this arrangement disclosed in Fig. 1 is that the drum 17 is conveniently located where it is within the view of the driller and its operation therefore better controlled.

In Figs. 4 and 5, I show an alternative form of my invention and corresponding parts are designated by numerals which correspond to similar or identical parts in the form of my invention shown in Figs. 1 to 3, inclusive, with the exception that a suffix "a" has been added to each numeral. In this form of my invention the jack shaft 33a is extended outwardly from the upright 30a and the rotary drive sprocket 80a is placed on the extending end of the shaft. The transmission 15a (which in this form of my invention is of a different design, as will be explained shortly) is placed beside the drawworks, as is the auxiliary engine 16a and base 94a. In this form of my invention, the sand reel, or robishaw drive, or drum 17a is placed to the rear of the drawworks and is operated by sprocket and chain means 112a which includes a sprocket 112b which may be locked to the jack shaft 33a by a clutch 112c.

In this form of my invention, the transmission includes a rotatable member 85a having a sprocket 86a driven by a chain 84a. This rotatable member 85a is rotatable on the drive shaft 91a but may be locked thereto by the clutch 98a. Rotatably mounted on the rotatable member 85a is an idler member or idler sprocket 85b which may be locked to the rotatable member 85a by means of a clutch 85c. Extending over the sprocket 85b is the chain 88a which extends to the sprocket 87a of the rotary machine.

In this form of my invention the countershaft 92 is eliminated and a simpler construction is employed. The mode of operation, however, is identical to that of the form of my invention shown in Figs. 1 to 3, inclusive, and the same drives may be obtained by operating the clutch 98a and 85c in the same manner as the clutches 98 and 100 were operated. The essential difference of operation in this form of my invention is that the reel 17a is driven directly from the jack shaft 33 whenever the clutch 112c is engaged. It will be seen that either the main engine may be employed to drive the drum 17a or the auxiliary engine through the transmission may be employed to drive the drum 17a, depending upon which of these elements are being employed to drive the jack shaft 33a.

I claim as my invention:

1. In an auxiliary drive for use in a derrick between a drawworks having a drive sprocket means, a rotary machine having a driven sprocket means, and an additional drivable means, the combination of: supporting means carrying a pair of auxiliary shafts in side by side parallel relation; a dual sprocket and associated clutch means on one of said shafts; a chain connecting said dual sprocket with one of said sprocket means; a first sprocket on the other of said shafts and having means to connect the same for simultaneous rotation; a chain connecting said first sprocket with said dual sprocket; a second sprocket and associated clutch means on said other of said shafts; a chain connecting said second sprocket and the other of sprocket means; an auxiliary engine connected to shaft having said dual sprocket and associated clutch means thereon and means including a clutch to connect the other of said shafts to said additional drivable means.

2. In an auxiliary drive for use in a derrick between a drawworks having a drive sprocket, a rotary machine having a driven sprocket, and an additional drivable means, the combination of: supporting means carrying a pair of auxiliary shafts in side by side parallel relation; a dual sprocket and associated clutch means on one of said shafts; a chain connecting said dual sprocket with one of said drive sprockets; a first sprocket on the other of said shafts and having means to connect the same for simultaneous rotation; a chain connecting said first sprocket with said dual sprocket; a second sprocket and associated clutch means on said other of said shafts; a chain connecting said second sprocket and said driven sprocket; an auxiliary engine connected to shaft having said dual sprocket and associated clutch means thereon; and means including a clutch to connect the other of said shafts to said additional drivable means.

3. In an auxiliary drive for use in a derrick between a drawworks having a drive sprocket means, a rotary machine having a driven sprocket means, and an additional drivable means, the combination of: supporting means carrying a pair of auxiliary shafts in side by side parallel relation; a dual sprocket and associated clutch means on one of said shafts; a chain connecting said dual sprocket with one of said sprocket means; a first sprocket on the other of said shafts and having means to connect the same for simultaneous rotation; a chain connecting said first sprocket with said dual sprocket; a second sprocket associated clutch means on said other of said shafts; a chain connecting said second sprocket and the other of said sprocket means; an auxiliary engine connected to one of said shafts so that by operation of said engine a driving force will be transmitted to such shaft; and means including a clutch to connect the other of said shafts to said additional drivable means.

SAMUEL W. WEBSTER.